(12) United States Patent
Gruschko et al.

(10) Patent No.: US 9,098,549 B2
(45) Date of Patent: Aug. 4, 2015

(54) METHOD FOR BUNDLED PREPARATION AND EXECUTION OF MULTIPLE DATABASE STATEMENTS

(75) Inventors: Boris Gruschko, Heidelberg (DE); Christian Mohr, Heidelberg (DE); Martin Strenge, Nussloch (DE)

(73) Assignee: SAP SE, Walldorf (DE)

( * ) Notice: Subject to any disclaimer, the term of this patent is extended or adjusted under 35 U.S.C. 154(b) by 318 days.

(21) Appl. No.: 13/212,109

(22) Filed: Aug. 17, 2011

(65) Prior Publication Data

US 2013/0046743 A1     Feb. 21, 2013

(51) Int. Cl.
*G06F 17/30* (2006.01)

(52) U.S. Cl.
CPC .... *G06F 17/30442* (2013.01); *G06F 17/30448* (2013.01); *G06F 17/30463* (2013.01)

(58) Field of Classification Search
CPC ............... G06F 17/30442; G06F 17/30448; G06F 17/30474; G06F 17/30545; G06F 17/30539; G06F 17/30935; G06F 17/30463; Y10S 707/99933; Y10S 707/99934
USPC .......... 717/141, 149, 150, 151, 160; 707/602, 707/713–714, 718, 737, 760, 768, 772
See application file for complete search history.

(56) References Cited

U.S. PATENT DOCUMENTS

| | | | |
|---|---|---|---|
| 5,596,745 A * | 1/1997 | Lai et al. ............................... | 1/1 |
| 2005/0165802 A1* | 7/2005 | Sethi et al. ..................... | 707/100 |
| 2008/0250046 A1* | 10/2008 | Nelson .......................... | 707/101 |

* cited by examiner

*Primary Examiner* — Jason Liao
*Assistant Examiner* — Berhanu Mitiku
(74) *Attorney, Agent, or Firm* — Mintz Levin Cohn Ferris Glovsky and Popeo, P.C.

(57) ABSTRACT

A system and method for preparing and executing multiple database statements to minimize communication overhead between a client application and a database, the method is presented. Multiple database statements are registered for preparation and execution, the registering further including bundling of preparation operations for the multiple database statements and bundling of execution operations for multiple database statements. All of the bundled preparation operations and execution operations for the multiple database statements are executed in a single transaction between the client application and the database, and thereafter results of the preparation operations and the execution operations are accessible by a client application.

12 Claims, 3 Drawing Sheets

METHOD FOR BUNDLED PREPARATION AND EXECUTION OF MULTIPLE DATABASE STATEMENTS

BACKGROUND

This disclosure relates generally to database management systems, and more particularly to a method and system for bundled preparation and execution of multiple database statements.

Structured Query Language (SQL) is a language for managing data in database management systems (DBMSs), and an important language element of SQL is the SQL statement. Database client (DB client) software provides database client applications with a database client application programming interface (API) for accessing, manipulating, and managing data in the DBMS. A client application (together with the DB client) and a database potentially run on different interconnected computer systems in a heterogeneous computer system landscape. Object oriented DB client APIs often provide a statement class or a similar concept which embodies the semantics of an executable SQL statement.

A family of DB client APIs, for example open database connectivity (ODBC) or Java database connectivity (JDBC), provides a mechanism to establish connections to a database and interact with a connected database by means of SQL statements. The DB client API allows client applications to send an SQL statement, potentially together with input data, to the database system where it is executed by the DBMS. After execution of the SQL statement, output data is transferred back to the client DB system, where it is accessible by means provided by the DB client API.

Each DB client application API has to prepare a set of SQL statements $P=\{p1, p2, \ldots pm\}$ for later execution as well as to execute a set of statements $S=\{s1, s2, \ldots sn\}$. Moreover, dependencies between the elements of P and S may exist, meaning that each statement (in the union U of P and S) potentially depends on one or more other statements (elements of U). However, the dependencies always result in a directed acyclic dependency graph.

The preparation and execution of all those statements leads to a number of roundtrips between client application and database. Since the number of roundtrips has a significant impact on the overall performance, there are scenarios in which the preparation of multiple statements in conjunction with the additional execution of statements imposes a significant negative effect on the overall performance, especially when data transport over a network is involved.

SUMMARY

In general, this document discloses techniques and platforms for bundled preparation and execution of multiple database statements.

In one aspect, a computer-implemented method for preparing and executing multiple database statements to minimize communication overhead between a client application and a database is provided. The method includes registering the multiple database statements for preparation and execution, the registering further including bundling of preparation operations for the multiple database statements and bundling of execution operations for multiple database statements. The method further includes executing, by a processor in a server system associated with the database, all of the bundled preparation operations and execution operations for the multiple database statements in a single transaction between the client application and the database. The method further includes accessing, by a processor in the client application, results of the preparation operations and the execution operations.

In another aspect, a computer-implemented method for minimizing communication overhead between a client application and a database includes the steps of bundling preparation operations for multiple database statements, defining dependencies between the multiple database statements, bundling execution operations for the multiple database statements, and processing the multiple database statements in a single transaction between the client application and the database.

In yet another aspect, a system for minimizing communication overhead between a client application and a database includes a server system that hosts the database, and a client system hosting the client application. The client system includes one or more client application programming interfaces (APIs) for communicating with a system query language layer of the database on the server system. The system further includes a bundled execution and preparation service associated with the one or more client APIs, the bundled execution and preparation service bundling preparation operations for multiple database statements and bundling execution operations for the multiple database statements. The system further includes a processor in the server system that processes the multiple database statements in a single transaction between the client application and the database.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
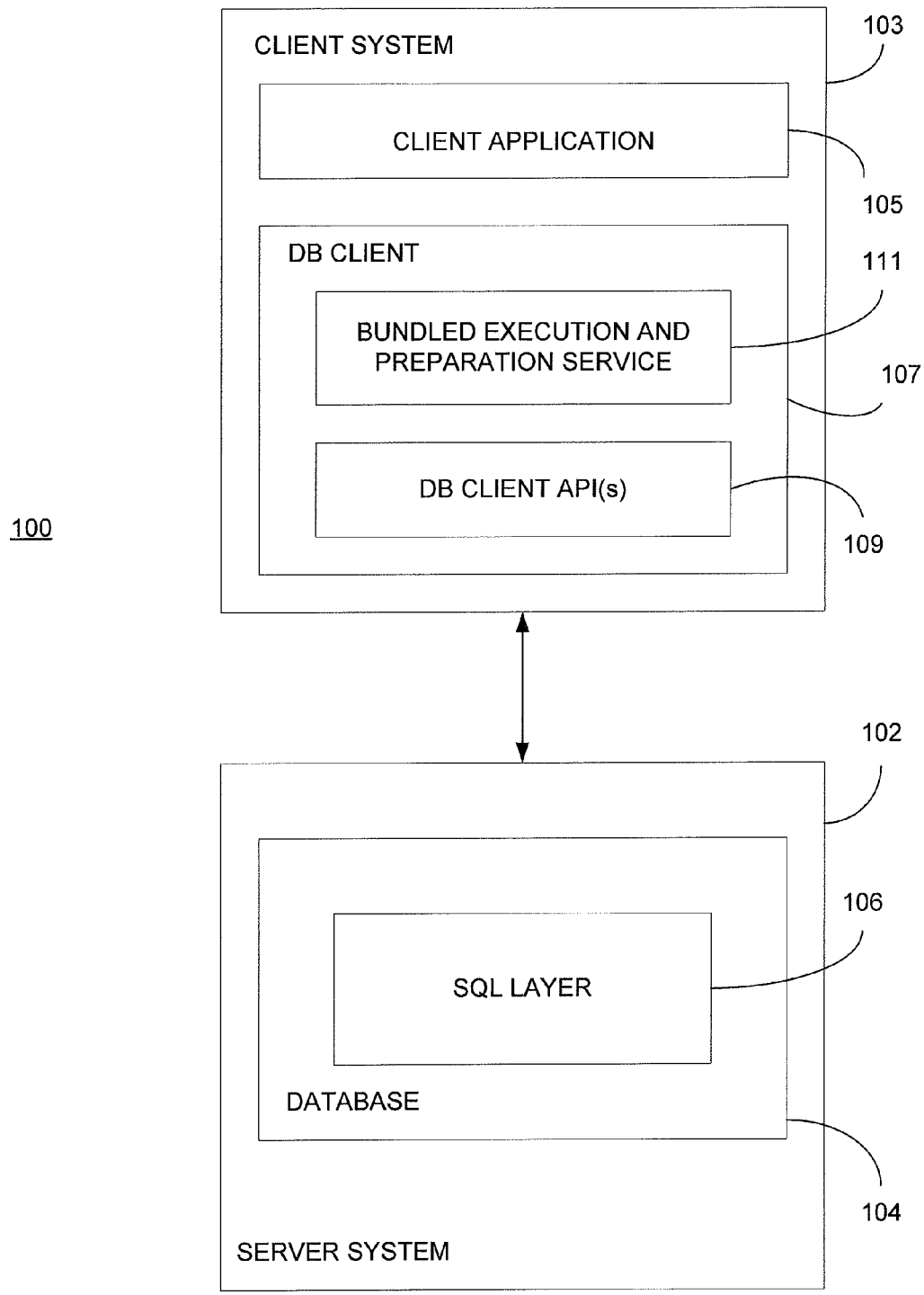
FIG. 1 illustrates a system for executing bundled preparation and execution of multiple database statements.

This document describes techniques for executing bundled preparation and execution of multiple database statements. FIG. 1 illustrates a system 100 for executing such techniques. The system 100 includes a server system 102 with a client system 103 that executes database transactions, typically at the request or instruction from the client system 103. The client system 103 can be a computer, such as a laptop or desktop computer, a mobile device, or other type of data processor. The client system 103 includes a client application 105, preferably software that is executed by a processor of the client system 103. The client system 103 further includes a database (DB) client 107 that interacts with a database 104 on the server system 102 via one or more DB client application programming interfaces (APIs) 109. The DB client APIs 109 specify a communication interface with the database 104, and for accessing, manipulating and managing data in the database 104. The DB client 107 also includes a bundled execution and preparation service 111, that functions as described below.

The database 104 includes any number of data processors and storage media for providing the database. The database 104 can be any type of database, such as a relational database or an in-memory database (i.e. data stored and organized on main memory of the server system). The bundled execution and preparation service 111 bundles multiple SQL statements for being sent to an SQL layer 106 of the database 104 for execution or preparation.

To optimize performance, the DB client 107 prepares an SQL statement for execution. Object oriented DB client APIs 109 can provide a prepared statement class, or a similar object that embodies the semantics of a first prepared and later executed SQL statement. During a preparation step the statement is preprocessed by the database 104 to enable a more efficient, parallel execution afterwards using different input data.

DB client APIs 109 utilize the bundled execution and preparation service 111 to bundle multiple statement execution and preparation operations. This covers both bundling of multiple statements for execution, as well as bundling multiple statements for preparation. The functionality that is provided depends on the capabilities of the specific DB client API 109. Bundling execution operations of different kinds is called batch or group execution.

Accordingly, the DB client 107 can transfer the input data of all execution operations in one single step from the client system 103 to the SQL layer 106 of the database 104 of the server system 102. The same is true for the output data of all the execution operations. The bundling of execution operations improves the overall performance by reducing the total number of roundtrips between client system 103 and the server system 102.

Figure 2:
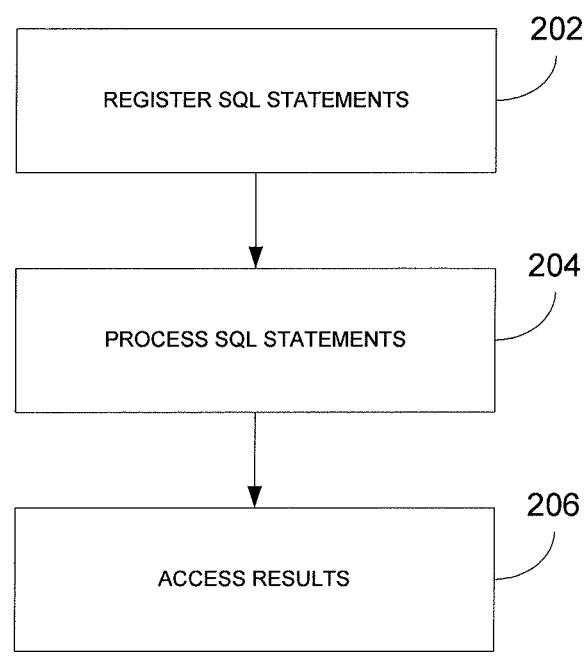
FIG. 2 is a flowchart of a method for executing bundled preparation and execution of multiple database statements.

As described above, the DB client 107 provides a method, exposed as part of the DB client API 109, that enables (a) the bundling of preparation operations for multiple statements combined with (b) the bundling of execution operations for multiple statements. As shown in FIG. 2, the interaction of a client application 105 with the DB client API 109 generally includes three main steps: registration of multiple SQL statements (202) at the DB client; 2) processing of the bundled, registered SQL statements (204) in a single roundtrip between the client system 103 and the server system 102; and accessing the results of the bundled registered SQL statements. Each of these steps is explained in further detail below and with reference to FIG. 3.

Figure 3:
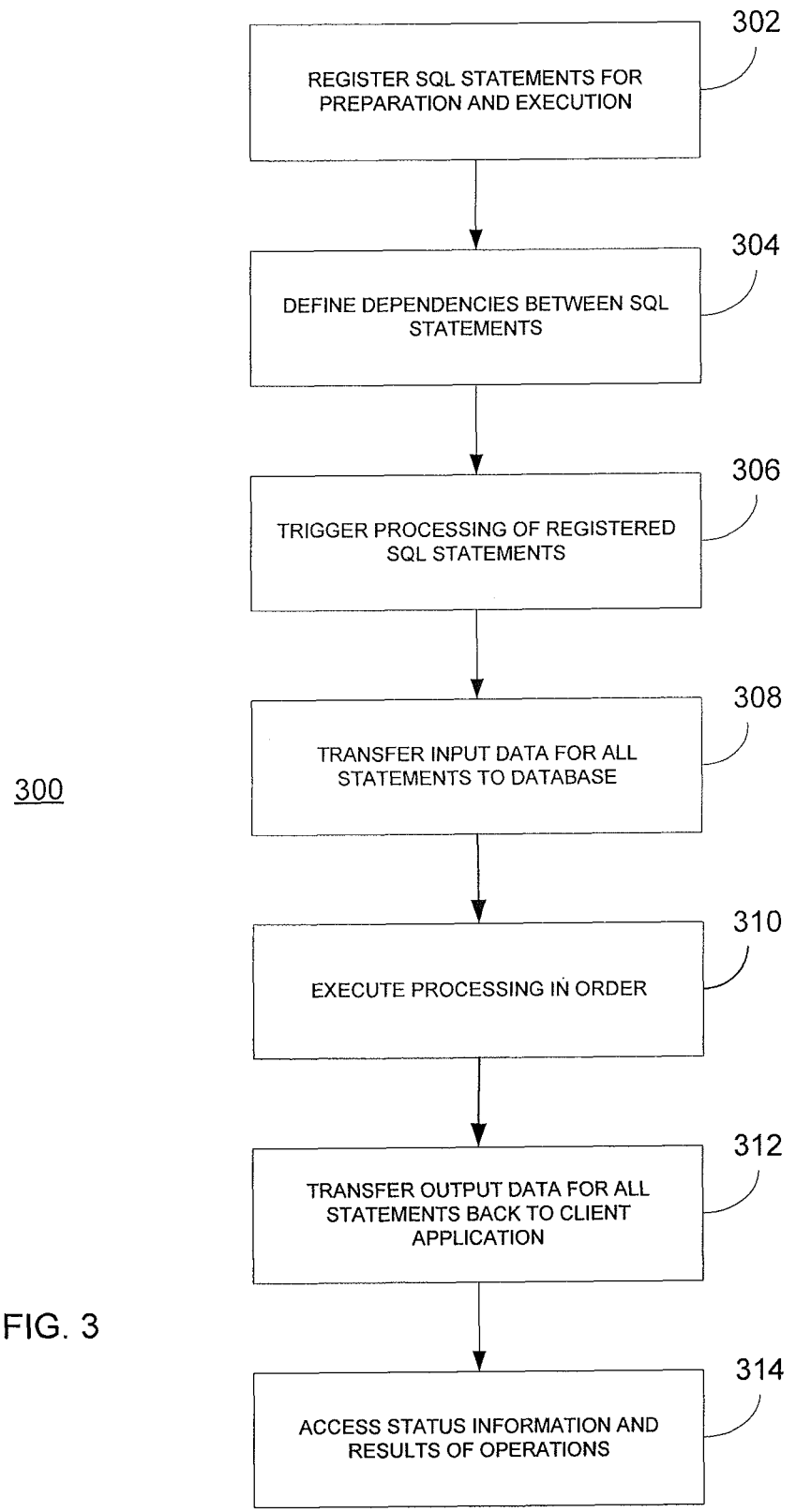
FIG. 3 is a flowchart of the method shown in FIG. 2 in greater detail.

I. Registration: As shown in FIG. 3, at 302, the client application registers SQL statements (a) for preparation and (b) for execution. At 304, dependencies that potentially exist between those statements are defined explicitly or implicitly (e.g. the registration order can reflect all existing dependencies). Steps 302 and 304 can be executed in any order, and may occur simultaneously in a single process step.

II. Processing: At 306 the client application triggers the processing. This leads to only one single roundtrip between the client application and the database. During this roundtrip, at 308 the input data for all statement is transferred to the database, and then all statements are prepared and executed in correct order, at 310. At 312 the output data for all statement is transferred back to the client application.

III. Accessing results: At 314, the client application can access status information (including errors) and the results of the execution and preparation operations.

Object oriented DB client APIs, for example, can provide the executed SQL statements as instances of class statement and the prepared SQL statements as instances of class prepared statement. This would allow client applications to handle the results of the overall operation conveniently. The bundling enables the preparation of multiple statements for later execution together with the execution of multiple statements in one single roundtrip between client application and database. This limits the communication overhead, independently of the dependency graph between statements.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method for preparing and executing multiple database statements to minimize communication overhead between a client application and a database, the method comprising:

registering the multiple database statements for preparation and execution, the registering further comprising bundling of preparation operations for the multiple database statements, bundling of execution operations for multiple database statements, and defining dependencies between the multiple database statements prior to executing the bundled preparation operations and the execution operations of the multiple statements, wherein the defining further comprises explicitly defining dependencies between the multiple database statements prior to executing the bundled preparation operations and the execution operations of the multiple statements;

executing, by a processor in a server system associated with the database, all of the bundled preparation operations and execution operations for the multiple database statements in a single transaction between the client application and the database to generate at least one instance of a class statement representative of at least one executed statement and at least one instance of a class prepared statement representative of at least one prepared statement; and accessing, by a processor in the client application, results of the preparation operations and the execution operations, the results containing the at least one instance of the class statement and the at least one instance of the class prepared statement.

2. The method in accordance with claim 1, wherein the defining further comprises at least one of the following: implicitly defining dependencies between the multiple database statements prior to executing the bundled preparation operations and the execution operations of the multiple statements, and explicitly defining dependencies between the multiple database statements prior to executing the bundled preparation operations and the execution operations of the multiple statements.

3. The method in accordance with claim 1, wherein the bundled preparation operations and execution operations are executed in order of the multiple statements and dependencies defined between the multiple statements.

4. The method in accordance with claim 1, further comprising:

transferring input data for the multiple database statements to the database during the executing.

5. The method in accordance with claim 4, further comprising:

transferring output data for the multiple database statements to the client application.

6. A computer-implemented method for minimizing communication overhead between a client application and a database, the method comprising:

bundling preparation operations for multiple database statements;

defining dependencies between the multiple database statements, wherein the defining further comprises explicitly defining dependencies between the multiple database statements prior to executing the bundled preparation operations and the execution operations of the multiple statements;

bundling execution operations for the multiple database statements;

processing the multiple database statements in a single transaction between the client application and the database;

executing, by a processor in a database management system associated with the database, all of the bundled preparation operations and bundled execution operations for the multiple database statements to generate at least one instance of a class statement representative of at least one executed statement and at least one instance of a class prepared statement representative of at least one prepared statement, and accessing, by a processor in the client application, results of the processing, the results containing the at least one instance of the class statement and the at least one instance of the class prepared statement.

7. The method in accordance with claim 6, wherein the bundled preparation operations and execution operations are executed in order of the multiple statements and dependencies defined between the multiple statements.

8. The method in accordance with claim 6, further comprising:

transferring input data for the multiple database statements to the database during the executing.

9. The method in accordance with claim 6, further comprising:

transferring output data for the multiple database statements to the client application.

10. A system for minimizing communication overhead between a client application and a database, the system comprising:

a server system that hosts the database;

a client system hosting the client application and including one or more client application programming interfaces (APIs) for communicating with a system query language layer of the database on the server system;

a bundled execution and preparation service associated with the one or more client APIs, the bundled execution and preparation service bundling preparation operations for multiple database statements, bundling execution operations for the multiple database statements, and defining dependencies between the multiple database statements prior to executing the bundled preparation operations and the execution operations of the multiple statements, wherein the defining further comprises explicitly defining dependencies between the multiple database statements prior to executing the bundled preparation operations and the execution operations of the multiple statements; and a processor in the server system that processes the multiple database statements in a single transaction between the client application and the database, the processor executes all of the bundled preparation operations and execution operations for the multiple database statements in a single transaction between the client application and the database to generate at least one instance of a class statement representative of at least one executed statement and at least one instance of a class prepared statement representative of at least one prepared statement;

wherein a processor in the client application accesses the results of the preparation operations and the execution operations, the results containing the at least one instance of the class statement and the at least one instance of the class prepared statement.

11. The system in accordance with claim 10, wherein the bundled execution and preparation service defines dependencies between the multiple database statements by performing at least one of the following: implicitly defining dependencies between the multiple database statements prior to executing the bundled preparation operations and the execution operations of the multiple statements, and explicitly defining dependencies between the multiple database statements prior to executing the bundled preparation operations and the execution operations of the multiple statements.

12. The system in accordance with claim 10, wherein the bundled execution and preparation service is hosted on client system.

* * * * *